United States Patent [19]

Stana

[11] 4,299,724
[45] Nov. 10, 1981

[54] PROCESS FOR THE RECOVERY OF LIQUID EXTRACTANT AND ACID FROM EMULSIONS FORMED DURING METAL RECOVERY FROM ACID SOLUTIONS

[75] Inventor: Regis R. Stana, Lakeland, Fla.

[73] Assignee: Wyoming Mineral Corporation, Lakewood, Colo.

[21] Appl. No.: 13,595

[22] Filed: Feb. 21, 1979

[51] Int. Cl.$^3$ .................................................. B01D 17/04
[52] U.S. Cl. ......................................... 252/348; 423/10
[58] Field of Search ............... 252/348; 210/71; 423/8, 423/9, 10

[56] References Cited

U.S. PATENT DOCUMENTS

| | | | |
|---|---|---|---|
| 994,100 | 5/1911 | Brown | 252/348 |
| 1,573,321 | 2/1926 | Leeper | 252/348 |
| 1,617,739 | 2/1927 | Averill | 252/348 |
| 3,637,522 | 1/1972 | Young | 252/348 |
| 3,644,214 | 2/1972 | Akell | 252/348 |
| 3,969,476 | 7/1976 | Lucas et al. | 423/9 |
| 4,087,512 | 5/1978 | Reese et al. | 423/321 R |
| 4,141,854 | 2/1979 | Pavilcius et al. | 423/9 |

*Primary Examiner*—Deborah L. Kyle
*Attorney, Agent, or Firm*—D. P. Cillo

[57] ABSTRACT

A method of recovering liquid from an emulsion formed in a liquid-liquid contacting process, where the emulsion comprises at least one of the liquids entrapped by water-permeable membranes, comprises: admixing water and the emulsion in a volume ratio of water:emulsion of between 0.5 to 4.5:1 and raising the temperature of the admixture to between about 45° C. and 99° C., to cause water permeation of the membranes, causing them to disintegrate and release liquid, forming a three-phase composition consisting essentially of the two liquids and the solids.

8 Claims, No Drawings

PROCESS FOR THE RECOVERY OF LIQUID EXTRACTANT AND ACID FROM EMULSIONS FORMED DURING METAL RECOVERY FROM ACID SOLUTIONS

BACKGROUND OF THE INVENTION

Solvent extraction processes for the recovery of metals, and particularly uranium, from aqueous acid solutions, such as crude, industrial, 30% phosphoric acid solutions produced from phosphate rock, are well known. Typically, "brown", wet process phosphoric acid solution will contain about 600 grams/liter of phosphate, about 15 grams/liter of sulfate, about 9 grams/liter of iron, about 0.1 to 0.2 gram/liter of uranium and about 1 to 10 grams/liter of decayed organic material, organic humic acids, and other sludge-forming contaminant solids. These sludge-forming contaminant solids are soluble in the acid or are extremely fine, and will pass through the finest of filters. Accordingly, it is not technically feasible to fine-filter the feed acid solution to remove all of the contaminant solids.

The sludge-forming contaminants in the acid solution cause stable sludge emulsions during metal extraction. These emulsions will form and collect at the organic-aqueous interface, generally in the settler, in any solvent extraction process that uses organic metal extractant. The volume of sludge emulsion formed is over about 1.5 gallons/1,000 gallons of acid solution feed. If the sludge is not removed, flooding of the settlers results, and the equipment must be shut down.

The sludge emulsion is comprised of only about 2% to about 7% by volume of organic contaminant solids, with the rest of the emulsion being about equal volumes of acid solution and organic extractant. Simply discarding the sludge would result in the loss of expensive organic extractant, such as di(2-ethylhexyl) phosphoric acid (D2EHPA) - trioctylphosphine oxide (TOPO), plus the acid, including the uranium and other metals contained in both the acid and extractant solution. The cost for extractant and acid lost would be about $10/1,000 gallons of acid feed solution.

Reese et al., in U.S. Pat. No. 4,087,512, filters the sludge at room temperature. There, the sludge is fed directly into the filter from the settler, without the addition of any materials. This process recovers only about 60 to 70 vol. % of the extractant and acid from the emulsion, since the extractant, acid, and organic contaminant components are still in a stable emulsion form and intimately bound together. More importantly, the rate of filtration is extremely low, slowing the whole operation unless the emulsion is withdrawn from the process, stored, and then filtered at a later date.

Emulsion breaking is known in the art. Averill, in U.S. Pat. No. 1,617,739, relating to water-in-oil emulsions, teaches addition of 1 to 4 parts of water per 1 part water-in-oil emulsion. Then, a surface-active agent, such as gelatine, modified glue or gum acacia, is added and the temperature of the mixture is raised to at least 70° C. This causes the emulsion to break and separate into its component parts.

Akell, in U.S. Pat. No. 3,644,214, teaches breaking liquid-liquid interface emulsions, such as oil-water, aniline-water, or methanol-water-xylol, without addition of surface active agents. Akell teaches adding an excess of one liquid component of the emulsion, in order to shift the composition into a single phase, according to the solubility diagram for the component system. If any solids, such as dirt and rust, are present after the single phase is formed, they would be filtered from the liquid using conventional techniques. Heating is considered impractical where there are large process throughputs, and is considered detrimental if one or more of the components are subject to reaction. No surface-active agents are added because they are expensive and are considered to constitute foreign materials in the system.

What is needed, to break the sludges formed by phosphoric acid solvent extraction, is a process for breaking up a three-component emulsion, containing a substantial amount of organic solids in an acidic-organic extractant medium. The process should allow quick filtration, and recover at least 90 vol. % of the acid and organic extractant as separate liquids from the sludge emulsion. No contaminating surface-active agents should be required.

SUMMARY OF THE INVENTION

The above problems are solved and the above need is met by a process of adding an effective amount of water or steam to the sludge emulsion at a high temperature. The method of this invention is applicable to a liquid-liquid contacting process, where at least one of the liquids contains organic solids and where the liquids possess a relatively low mutual solubility and form two liquid phases separated by an emulsion; where the emulsion comprises at least one of the liquids entrapped or surrounded by surface active solids acting as a water-permeable membrane.

Specifically, the method involves withdrawing the emulsion, admixing water with the emulsion, in a volume ratio of water:emulsion of between about 0.5 to 4.5:1, and raising the temperature of the admixture to between about 45° C. and 99° C. The hot water is drawn into and permeates the aqueous filled membranes by the osmotic pressure difference of the two solutions, filling the membranes and causing them to burst or disintegrate, and release the contained liquid, thereby forming a three-phase composition consisting essentially of the two relatively immiscible liquids and the solids. The solids will constitute between about 2 vol. % to about 7 vol. % of the composition. Both of the liquids are then collected from the composition, leaving the solids which can be disposed of. This method can recover over about 90 vol. % of the valuable liquids from the emulsion.

DESCRIPTION OF THE PREFERRED EMBODIMENTS

The sludge emulsion formed by mixing 30% wet process phosphoric acid solution with uranium-extracting solvent such as D2EHPA-TOPO in an extractor or a mixer-settler, has a rheology that is non-Newtonian and, therefore, it does not flow normally. These sludge emulsions, formed at the organic-aqueous interface in metal extraction processing of acidic solutions, using an organic extractant, consist primarily of small drops of acid, surrounded by stable, complex, inorganic-organic surface active semipermeable types of membranes, immersed in a body of organic extractant, although some organic extractant may also be entrapped by the membranes.

Osmosis occurs when two solutions of different concentrations in the same solvent are separated from one another by a membrane. If the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis," "pressure osmosis" and "hyperfiltration" are used to describe this process.

In the method of this invention, the sludge emulsion, formed upon interface contact of an acid solution containing organic humic acids and minor amounts of valuable metals, and an organic metal extractant, is first collected. The sludge emulsion comprises small drops of acid, about 0.005 to 0.015 inch in diameter, trapped and surrounded by a stable, surface active solids membrane which can be permeated by hot water under osmotic pressure conditions. The solids content of the sludge emulsion is generally between about 2 vol. % to about 7 vol. %.

Water, preferably having a temperature of between about 80° C. and 100° C., is added to the sludge emulsion in a volume ratio of water:sludge emulsion of between about 0.5 to 4.5:1, preferably between about 0.5 to 1.5:1. The hot water functions to travel or diffuse through the membranes under osmotic pressure, in an amount effective to cause the membrane to break or burst and release the acid or other contained liquid.

The sludge emulsion, which typically has a viscosity of between about 6,000 cps. to 15,000 cps., is broken up after mixing with the hot water, to form a mixture of acid solution, organic extractant and solids. This mixture has a viscosity of only about 75 cps. to 250 cps., indicating that the hot water addition has dramatically changed the hydrodynamic nature of the sludge emulsion. The water can also be added cold and the water-sludge admixture heated, steam can be passed through the sludge or cold water may be added to hot sludge; so long as the temperature of the water-sludge admixture is raised to between about 45° C. and 99° C., in order to allow water passage through the membrane.

The semipermeable type of osmotic membrane formed by the solids in the emulsion has a thickness in the range of about 0.5 to 15 microns. The membrane skin is comprised of, typically, 40% to 60% of organic surface active materials and 40% to 60% of inorganic solids. The inorganic materials are mainly aluminum, silica and iron that are trapped or contained in the organic surfactant component. If the water-sludge admixture has a temperature of under about 45° C., the water is not effective to break the stable membrane. Over a 99° C. admixture temperature, the admixture presents a handling and filtering problem. The preferred admixture temperature, prior to filtering or other type of liquid removal, is between about 50° C. and 85° C.

Over 4.5 parts by volume of water per 1 part by volume sludge, no increase in separation is apparent, and the filtration will take an excessive time due to the larger volume of admixture. Under 0.5 parts by volume of water, the amount of separation due to membrane rupture is substantially reduced. The preferred volume ratio of water:sludge emulsion is between about 0.75 to 1.25:1. For reasons not known at this time, even more improved results are obtained in terms of aqueous acid and organic extractant separation if the sludge emulsion is allowed to age from 7 to 14 days after collection from the extractor or mixer-settler. It is believed that allowing the emulsion to age causes discontinuous membranes to disperse and further consolidates stable membranes. When water is added and heated, it enters and breaks membranes, rather than just mixing with discontinuous organic solid material.

The process of this invention does not involve the formation of a single-phase mixture of acid solution and organic extractant, or addition of any surface-active or demulsifying agents to the sludge emulsion. While the process has been primarily described with regard to emulsions formed during uranium extraction of phosphoric acid solutions, it would be equally suitable in breaking up emulsions formed during extraction of any type of solution in a liquid-liquid contacting operation where a similar sludge is formed.

After the water addition, heating to between 45° C. and 99° C., and separation of the emulsion components in a suitable container, the acid solution, which will form a bottom layer, and the organic extractant, which will form a top layer, can be drawn off, leaving the 2 to 7 vol. % sludge solids which can be disposed of. Alternatively, the three-phase composition can first be filtered to remove the solids and then the acid solution and organic extractant separated by decantation, after which each can be collected.

EXAMPLE

Oxidized, clarified, cooled, commercial grade, wet process, aqueous, phosphoric acid (30% $P_2O_5$; sp. gr.=1.36), containing about 2 grams/liter of humic acids and other organic contaminants, and about 0.2 gram/liter of uranium was added to a mixer-settler unit, and mixed with an organic metal extractant solvent. The organic extractant consisted of 21 vol.% of a 4:1 mole ratio mixture of di(2-ethylhexyl) phosphoric acid (D2EHPA):atrioctylphosphine oxide (TOPO). The acid:extractant volume ratio was 1:2. The mixer-settler unit was maintained at a temperature of about 40° C.

A viscous, slow settling, jelly-like, sludge emulsion phase formed in the mixer-settler from interaction of the impurities in the aqueous acid with the organic extractant. This voluminous interfacial emulsion was withdrawn and placed in a storage tank. Four 50 ml. samples were withdrawn from the tank for testing. The viscosity was measured at about 12,000 cps. at 25° C. The sludge emulsion was observed under a high-power microscope and compressed entrapped droplets of acid contained within a membrane.

In the case of sample A, 50 ml. of 25° C. sludge emulsion A was mixed in a closed container with 50 ml. of added water which had been preheated to 90° C. The volume ratio of water:sludge emulsion was 1:1. The final temperature of the admixture was 50° C. This admixture, made in accordance with this invention, broke and began to separate into separate phases after about 2 minutes. The hot admixture was then fed through a Buchner funnel vacuum filtration system, at 22 inches of Hg, containing 6 sq. in. of No. 40 Whatman filter paper, and the filtration rate was recorded.

As comparative examples, three other samples were filtered. Sample B was similar to sample A, except that the added water was not preheated. The final temperature of the sample B admixture was 25° C., and the emulsion did not break or begin to separate.

In the case of the sample C sludge emulsion, 50 ml. of sludge was fed through the filtration system at 25° C. with no water addition. For sample D, 50 ml. of sludge was first heated to 90° C., and then fed through the filtration system, with no water addition. The results of these runs on sample A, and comparative samples B-D are shown in Table 1 below:

TABLE 1

| Sample Admixture | Vol. Ratio $H_2O$:sludge | Filtration Temp. | Filtration Rate gal./sq.ft./hr. | Viscosity of Cooled Admixture cps. at 25° C. | Acid-Extractant Recovery |
|---|---|---|---|---|---|
| A | 50:50 | 50° C. | 25 | 100 | 95 vol. % |
| B* | 50:50 | 25° C. | 5 | 700 | 80 vol. % |
| C* | 0:50 | 25° C. | 1 | 1,200 | 70 vol. % |
| D* | 0:50 | 90° C. | 5 | 800 | 80 vol. % |

*Comparative samples

As can be seen, sample C, which is the standard method of room temperature sludge filtration, provides 1 gal./hr. of filtrate and 70 vol.% of acid-extractant recovery. Heating the sludge and filtering, it, as in sample D, improves the flux by a factor of 5, and lowers the viscosity somewhat when the admixture is cooled. Adding cold water as in sample B, does not show much improvement over sample D. However, dramatic improvement in flux and acidextractant recovery is seen in sample A, the method of this invention, where the admixture temperature is raised and water is added. Thus, the sludge emulsion could be processed almost 25 times faster by using the sample A technique over the standard sample C technique. After cooling other admixtures made by the sample A technique to 25° C., the viscosity was found to be 100 cps., and the membranes broken by hot water addition did not reform.

Similar results were obtained using sludge emulsions formed at a uranium extraction pilot plant operation. The sludge was formed, as described above, by the interaction of impurities in 30% wet process phosphoric acid with D2EHPA-TOPO organic extractant. The filtration rate for 25° C. sludge was less than 0.2 gal./sq. ft./hr. and only about 70 vol.% of the liquid was filtered from the sludge. The filtration rate for a 50° admixture of 1 part water:1 part sludge by volume was 2.6 ga./sq. ft./hr. with substantially all of the liquid being removed, i.e., about 98 vol.% of the trapped acid solution and extractant was recovered. The filtration rates were lower in the pilot-testing example because higher solids loading was obtained on the filter. The results still demonstrate an improvement by a factor of about 15 times in the flux rate using the heated admixture water:sludge system.

I claim:

1. In a liquid-liquid contacting process, involving an aqueous acid solution and organic liquid, where at least one of the liquids contains solid material and where said liquids possess relatively low-mutual solubilities and form two liquid phases separated by an emulsion, the process comprising the steps of:
   (A) withdrawing the emulsion, said emulsion comprising at said aqueous acid solution entrapped by water-permeable membranes formed by the solid material present in at least one of the liquids;
   (B) admixing water and the emulsion in a volume ratio of water:emulsion of between about 0.5 to 4.5:1 and raising the temperature of the admixture to between about 45° C. to 99° C., to cause water permeation of the membranes causing the membranes to disintegrate and release liquid, thereby forming a three-phase composition consisting essentially of the two liquids and the solid material; and then
   (C) separating the two liquids from the solid material.

2. The process of claim 1, wherein the admixture temperature is raised by adding water at a temperature of between about 80° C. and 100° C.

3. The process of claim 1, wherein the volume ratio of water:emulsion is between about 0.5 to 1.5:1.

4. The process of claim 1, wherein one liquid is an acid solution containing organic humic acids and minor amounts of metal and the other liquid is an organic metal extractant.

5. The process of claim 1, wherein one liquid is 30% phosphoric acid solution and the other liquid is a mixture of di(2-ethylhexyl) phosphoric acid and trioctylphosphine oxide.

6. The method of claim 1, wherein over 90 volume % of the liquids are separated from the solid material by filtration, the water permeates the membranes under an osmotic pressure condition, the solids content of the emulsion is between about 2 vol.% to about 7 vol.%, the viscosity of emulsion is between 6,000 cps. to 15,000 cps., and the viscosity of the three-phase composition after membrane disintegration is between about 75 cps. to 250 cps.

7. A process of separating the components of an emulsion, comprising aqueous liquid acid solution, liquid organic extractant and solid material, wherein the aqueous acid solution is entrapped by surface active water-permeable membranes formed by the solid material present, comprising the steps of:
   (A) admixing water and the emulsion in a volume ratio of water:emulsion of between about 0.5 to 4.5:1 and raising the temperature of the admixture to between about 45° C. to 99° C., to cause water permeation of the membranes causing the membranes to disintegrate and release liquid, thereby forming a three-phasecomposition consisting of the acid solution, the liquid extractant and the solid material, and then
   (C) separating the two liquids from the solid material.

8. The process of claim 7, wherein the volume ratio of water:emulsion is between about 0.5 to 1.5:1, over 90 vol. % of the liquids are separated from the solid material by filtration, the water permeates the membranes under an osmotic pressure condition, the solids content of the emulsion is between about 2 vol.% to about 7 vol. %, the viscosity of the emulsion is between about 6,000 cps. to 15,000 cps., and the viscosity of the three-phase composition after membrane disintegration is between about 75 cps. to 250 cps.

* * * * *